United States Patent [19]

Cavallerano

[11] Patent Number: 4,992,853
[45] Date of Patent: Feb. 12, 1991

[54] SYSTEM FOR TRANSMISSION AND RECEPTION OF A HIGH DEFINITION TIME MULTIPLEXED ANALOG COMPONENT (HDMAC) TELEVISION SIGNAL HAVING AN INTERLACED INPUT/OUTPUT FORMAT

[75] Inventor: Alan P. Cavallerano, Ossining, N.Y.

[73] Assignee: North American Philips Corporation, New York, N.Y.

[21] Appl. No.: 271,136

[22] Filed: Nov. 14, 1988

[51] Int. Cl.$^5$ .................. H04N 11/02; H04N 7/12
[52] U.S. Cl. .................. 358/12; 358/133; 358/141
[58] Field of Search .................. 358/12, 133, 141

[56] References Cited

U.S. PATENT DOCUMENTS 4,589,011  5/1986  Rzeszewski .................. 358/11
4,652,904  3/1987  van de Polder .................. 358/12
4,908,697  3/1990  Tsinberg et al. .................. 358/141

FOREIGN PATENT DOCUMENTS 225786  12/1983  Japan .................. 358/12
219083  12/1984  Japan .................. 358/12
134692  7/1985   Japan .................. 358/12
158785  8/1985   Japan .................. 358/12

OTHER PUBLICATIONS

Isnardi et al, "A Single Channel, NTSC Compatible Wide Screen EDTV System", HDTV Colloquium, Ottawa, Canada, Oct. 4–8, 1987.

Primary Examiner—John W. Shepperd
Attorney, Agent, or Firm—Michael E. Marion

[57] ABSTRACT

A system for transmitting an interlaced source signal, for example 1050 lines, 2:1 interlaced, via a MAC signal, and decoding and receiving same.

7 Claims, 12 Drawing Sheets $SI_1$ = INTERLACED SOURCE / FIELD 1 / LINE 1

$PI_1$ = DERIVED PROGRESSIVE FIELD 1 / LINE 1

$LSI_1$ = DERIVED LINE SUBTRACTION SIGNAL / FIELD 1 / LINE 1

$(1/4)SI_1 + (3/4)SI_3 = PI_1$ $SI_1 - SI_3 = LSI_2$ $(1/4)SI_5 + (3/4)SI_7 = PI_3$ $SI_5 - SI_7 = LSI_4$ $(1/4)SI_9 + (3/4)SI_{11} = PI$

525 LINES TOTAL
FIELD 1

$(3/4)S2_4 + (1/4)S2_6 = P2_2$ $S2_6 - S2_4 = LS2_3$ $(3/4)S2_8 + (1/4)S2_{10} = P2_4$

525 LINES TOTAL
FIELD 2

SOURCE FIELD ONE

X ————————————

$(1/4)(X) + (3/4)(X+2)$

X+2 ————————————

$(1/4)(X+2) + (3/4)(X+4)$

X+4 ————————————

525 LINES
EACH 1/60TH SECOND

SOURCE FIELD TWO

Y - - - - - - - - - - -

$(3/4)(Y) + (1/4)(Y+2)$

Y+2 - - - - - - - - - -

$(3/4)(Y+2) + (1/4)(Y+4)$

Y+4 - - - - - - - - - -

525 LINES
EACH 1/60TH SECOND

$SI_i$ = INTERLACED SOURCE / FIELD I / LINE I $PI_i$ = DERIVED PROGRESSIVE FIELD I / LINE I $LSI_i$ = DERIVED LINE SUBTRACTION SIGNAL / FIELD I / LINE I

Field 1:
- $(1/4)SI_1 + (3/4)SI_3 = PI_1$
- $SI_1 - SI_3 = LSI_2$
- $(1/4)SI_5 + (3/4)SI_7 = PI_3$
- $SI_5 - SI_7 = LSI_4$
- $(1/4)SI_9 + (3/4)SI_{11} = PI$

525 LINES TOTAL FIELD 1

Field 2:
- $(3/4)S2_4 + (1/4)S2_6 = P2_2$
- $S2_6 - S2_4 = LS2_3$
- $(3/4)S2_8 + (1/4)S2_{10} = P2_4$

525 LINES TOTAL FIELD 2

TRANSMISSION:

$$PI_j = (1/4)SI_1 + (3/4)SI_3$$

$$LSI_2 = SI_1 - SI_3$$

1050 INTERLACED RECONSTRUCTION:

$$SI_1 = (3/4)LSI_2 + PI_j + \{(1/4)SI_1 + (3/4)SI_3\}^{9.5 \text{ MHz}}_{4.5 \text{ MHz}}$$
$$= (SI_1)]^{4.75 \text{ MHz}}_{DC}$$

$$SI_3 = -(1/4)LSI_2 + PI_j + \{(1/4)SI_1 + (3/4)SI_3\}^{9.5 \text{ MHz}}_{4.75 \text{ MHz}}$$
$$= (SI_3)]^{4.75 \text{ MHz}}_{DC}$$

FIG.7

SYSTEM FOR TRANSMISSION AND RECEPTION OF A HIGH DEFINITION TIME MULTIPLEXED ANALOG COMPONENT (HDMAC) TELEVISION SIGNAL HAVING AN INTERLACED INPUT/OUTPUT FORMAT

Cross reference to related patents and applications which are specifically incorporated by reference herein:
(1) U.S. Pat. No. 4,694,338, issued Sept. 15, 1987;
(2) U.S. patent application Ser. No. 246,490, filed on Sept. 19, 1988 which is a divisional application of Ser. No. 931,756, filed Nov. 17, 1986;
(3) U.S. patent application Ser. No. 077,557 filed July 24, 1987; and
(4) U.S. patent application Ser. No. 252,954, filed Oct. 3, 1988.

FIELD OF THE INVENTION

The instant invention relates to the transmission and reception of high definition television signals and, more specifically, to transmission of high definition television signals in a multiplex analog component (MAC) format.

BACKGROUND OF THE INVENTION

The bandwidth of a television signal is a function of the spatial (horizontal, vertical) and temporal resolution to be contained in the signal. As increased resolution is desired in either the vertical, horizontal or temporal directions, the bandwidth of the signal must be increased. High definition television (HDTV) signals contain considerably more resolution than, for example, standard NTSC encoded signals. As a result, various ways have been proposed to generate and transmit HDTV signals, some of which are compatible to a greater or lesser degree with NTSC receivers.

U.S. Pat. No. 4,694,338 describes a system for transmitting an HDTV signal using two separate signals, one of which is fully compatible with existing NTSC receiving equipment and the other containing enhancement information which, when combined with the NTSC compatible signal in a specially designed receiver, reassembles the HDTV signal.

U.S. patent application Ser. No. 246,490, filed Sept. 19, 1988 (a divisional of Ser. No. 931,756), describes an apparatus for encoding HDTV signals of different formats, both progressive and interlaced, as time multiplexed analog components (MAC) multiplexed onto a line having a period which equals a single NTSC line (i.e. 63.555 usec.)

U.S. patent application Ser. No. 077,557 describes a high definition MAC transmission format comprising a signal which is time multiplexed on a line having a period which equals that of two NTSC lines, i.e. 127.11 usec. (referred to as a "superline"). This transmission format is referred to hereinafter as "HDMAC-60" and is designed to be used both as a master feeder signal between program origination and signal redistribution points (e.g. a terrestrial broadcast station and CATV headends), and a signal for DBS (direct broadcast satellite). One feature of the HDMAC-60 format is that it is easily transcoded to NTSC wherever it is necessary within the emission and consumer environments.

The '557 application describes HDMAC-60 encoding and decoding equipment for use with a source signal which is progressively scanned with a 59.94 Hz. frame rate featuring 525 lines in each field and a 16:9 aspect ratio. Although the HDMAC-60 signal can carry video information with a spatial resolution of at least 480 TV lines/picture height (TVL/PH) in the vertical direction and 495 TVL/PH resolution in the horizontal direction if derived from a high line rate studio signal such as 1050 lines, 2:1 interlaced, a system for encoding, transmitting and decoding such a signal using the HDMAC-60 line format, so as to accurately recreate the high definition 1050 2:1 source signal at the receiver, has not been described heretofore.

It is an object therefore of the instant invention, to provide a system for encoding a multiline interlaced signal, for example 1050 lines, 2:1 interlaced, using the HDMAC-60superline format, and decoding it after transmission so as to provide a high definition 1050, 2:1 interlaced signal at a HDTV receiver.

SUMMARY OF THE INVENTION

It is a feature of the instant invention, that an interlaced HDTV source signal, for example 1050 lines, 2:1 interlaced, is converted to, and transmitted as, a MAC signal and decoded back to an interlaced signal substantially without geometric distortion.

It is a further feature of the invention that the MAC signal is transcodable to NTSC, 1050 2:1 HDTV, and 525 1:1 HDTV.

It is a still further feature of the instant invention that it provides for the transmission of CD quality audio along with the video information.

It is a further feature of the invention that it can use the HDMAC-60 superline format, and with slight modification, the HDMAC-60 apparatus described in the '557 application.

BRIEF DESCRIPTION OF THE DRAWINGS

In the figures that follow, temporal update rates are represented for simplicity as fractions of 60 Hz, whereas the actual system is based on a 59.94 Hz temporal update for compatibility with NTSC.

FIG. 2 describes the conversion of the 1050, 2:1 interlaced source signal into a spatially correct 525, 1:1 progressive signal.

FIG. 6 is a summary of the equations used to derive the progressive signals and LS signals.

FIG. 7 summarizes the derivation of the the transmitted progressive signals and LS signals and the reconstruction of the 1050, 2:1 interlaced structure at the receiver.

DETAILED DESCRIPTION OF THE INVENTION

The instant invention, referred to hereinafter as "HDMAC-1050" system is a time multiplexed analog component high definition television system that has an input/output format of 1050 lines; 2:1 interlaced with a field rate of 59.94Hz. and an aspect ratio of 16:9. Although certain signal processing steps and hardware used in performing those steps, resemble the method and HDMAC-60 hardware disclosed in U.S. application Ser. No. 077,557 which is incorporated by reference herein several filtering operations unique and necessary to the HDMAC-1050 system are described herein. The detailed structure of the HDMAC-60 signal is described fully in the '557 application and therefore will not be repeated herein.

Figure 1:
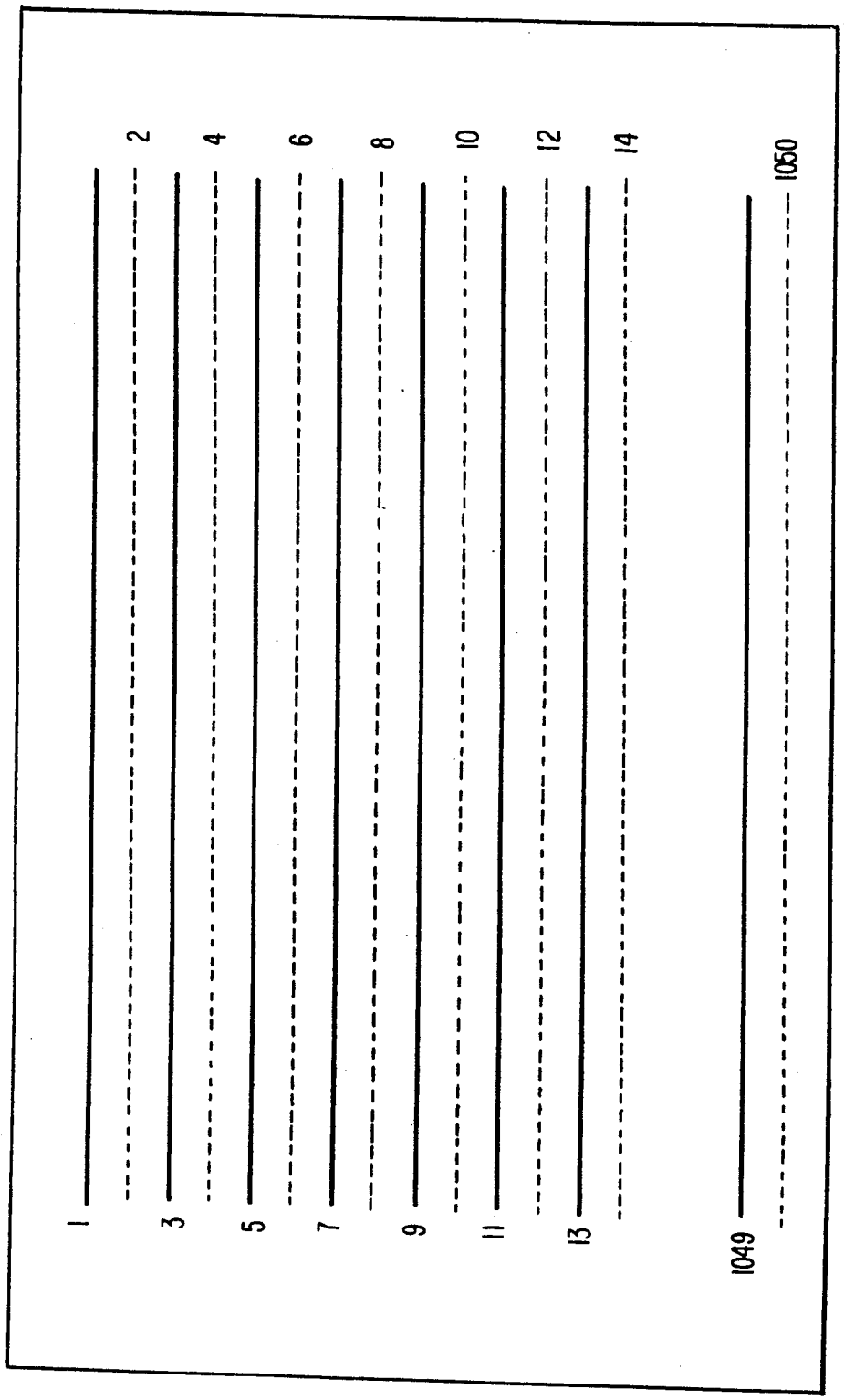
FIG. 1 describes the scanning structure of a 1050, 2:1 interlaced source signal.

The scanning structure for the source signal is depicted in FIG. 1. This signal can deliver nominally 650 television lines of vertical resolution per picture height (TVL/PH).

The data capacity requirements of HDMAC-1050 and HDMAC-60 are the same. That is, both formats deliver 525 television lines every 59.94th of a second. The signal processing compression/expansion ratios, fully described for HDMAC-60 in the '557 application, are the same for HDMAC-1050. Unlike the HDMAC-60 format however, the HDMAC-1050 structure is interlaced, which means that for an image, fields one and two are offset. This offers the potential for increased vertical resolution over that provided by HDMAC-60.

As is the case with HDMAC-60, HDMAC-1050 will also group the luminance lines into units of four lines. In the HDMAC-1050 format however two of the four lines are transmitted in the form of a 'line subtraction' (LS) signal that is similar to the 'line differential' signal in HDMAC-60 (lines LD2 and LD4). A wideband luminance line like the HDMAC-60 line Y3, and a narrow-band luminance line like the HDMAC-60 line Y1 are also transmitted.

In order for HDMAC-1050 to be NTSC-friendly the 1050 2:1 source scanning structure is converted to 525 lines 1:1 using a reversible process and then further encoded using the HDMAC-60 superline format. The algorithm chosen to perform this function will be described below. Once transmitted and received as a HDMAC signal, the original source processing is reversed at the HDMAC-1050 receiver, and the 1050 2:1 geometry is restored.

1050 2:1 to 525 1:1 Reversible Conversion

Figure 3:
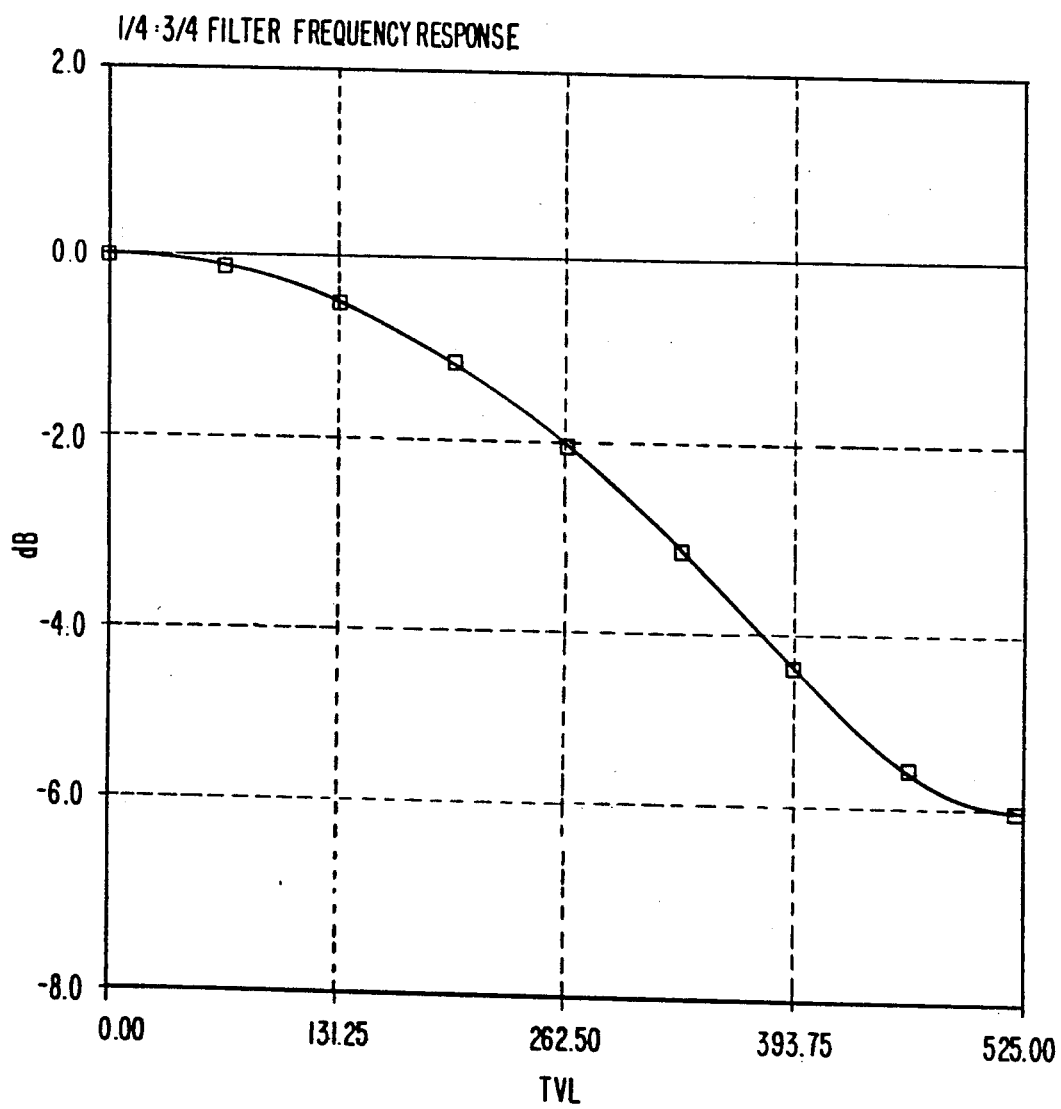
FIG. 3 describes the frequency response of a vertical filter which can be used to perform the conversion of FIG. 2.

The first step in the HDMAC-1050 process is to convert the 1050 2:1 interlaced image to a 525 1:1 progressive image, using an algorithm that will allow the 1050 2:1 interlaced image to be faithfully reconstructed at the HDMAC-1050 receiver. This procedure is initiated as shown in FIG. 2, where the odd lines x, x+2, x+4 are 525 source lines from odd field 1 and the even lines y, y+2, y+4 are 525 interlaced lines from even field 2. Then the normal values for x are 1, 3, 5, ..., 1049; and the normal values for y are 2, 4, 6, ..., 1050. The lines of the first (odd) field (1, 3, 5, ..., 1049) are vertically filtered according to the filter function: $(\frac{1}{4})x+(\frac{3}{4})(x+2)$. The lines of the second (even) field are vertically filtered according to the similar filter function: $(\frac{3}{4})y+(\frac{1}{4})(y+2)$. The effect of vertically filtering the original source 1050 interlaced lines is to create 525 lines every field that fall spatially in the same vertically interpolated position from field to field. Thus, the resulting vertically filtered fields may be displayed on a 525, 1:1, 59.94 Hz monitor with a correct geometric structure. However, the vertical filter will tend to suppress vertical frequencies around 525 TVL/PH by 6 dB, as shown in FIG. 3. This is favorable to reduce some of the strong vertical frequencies from the original 1050, 2:1 source that will eventually alias in the 525, 1:1 and 525, 2:1 compatible displays.

Figure 4:
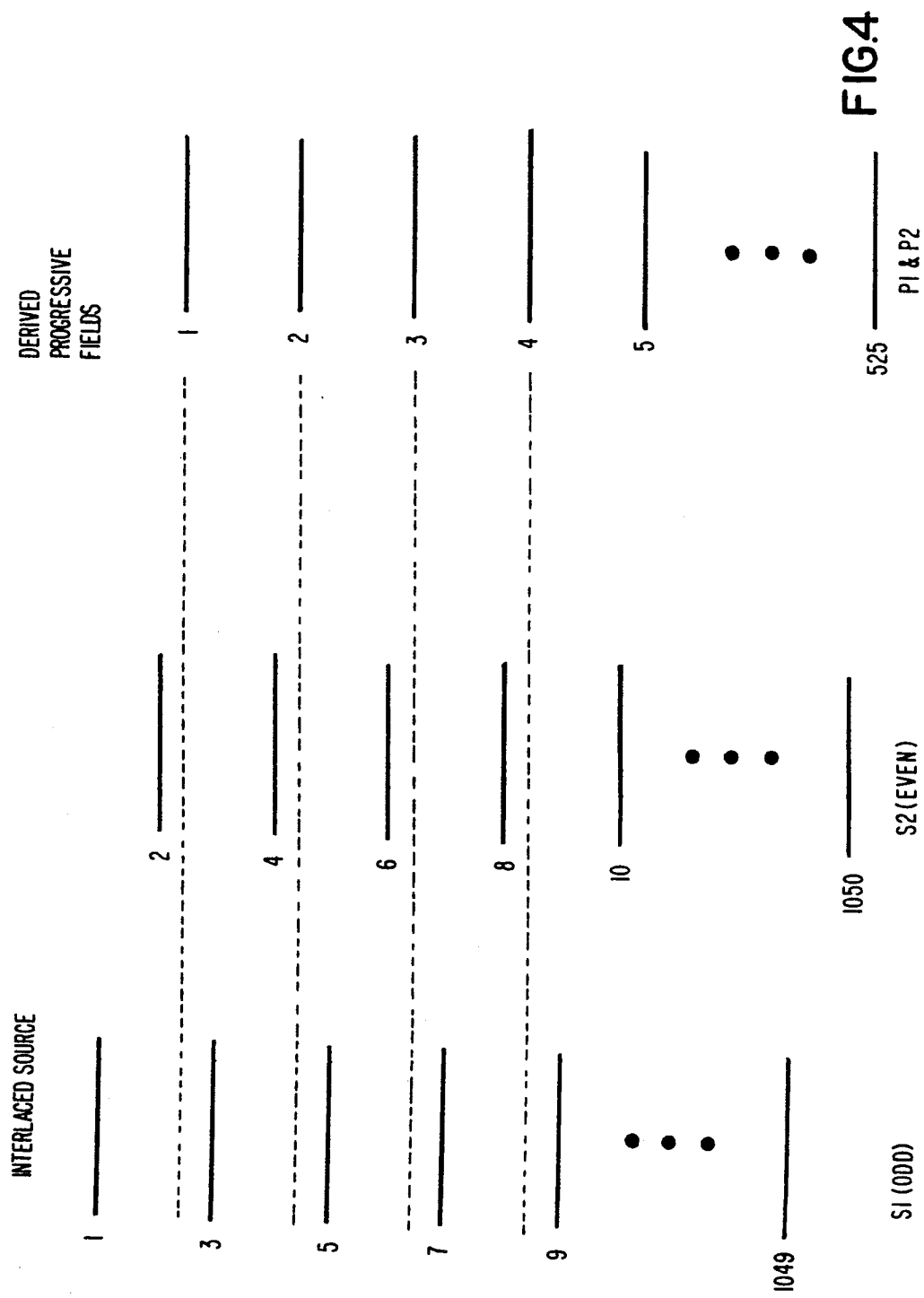
FIG. 4 describes the structure of the interlaced source fields and the derived progressive fields.

The vertical filter function requiring field to field alternation of coefficients from $(\frac{1}{4}):(\frac{3}{4})$ and $(\frac{3}{4}):(\frac{1}{4})$ will result in progressive fields of 525 lines at 59.94Hz as shown in FIG. 4. Note that there has been up to this point no change in the data capacity of the scanning structure — 1050 2:1 and 525 1:1 both generate 525 lines at 59.94 Hz. The progressive lines of the derived progressive fields are denoted as P1, P2, P3, ....

Figure 5:
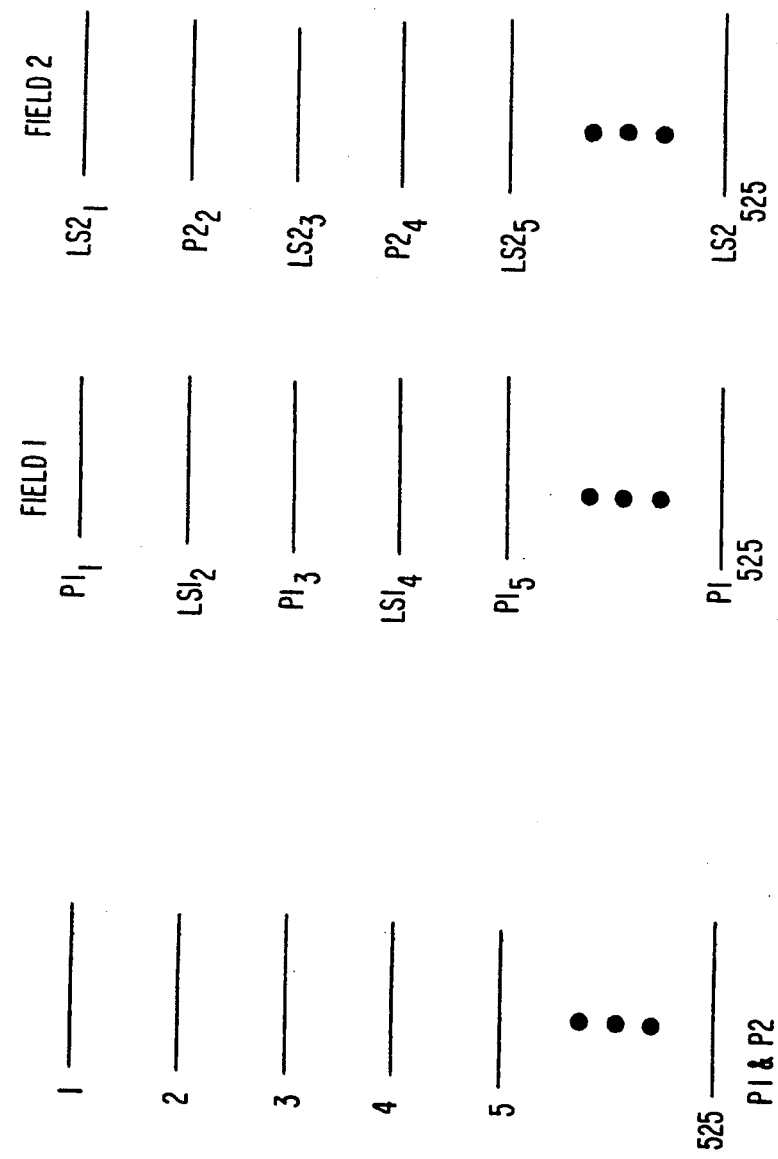
FIG. 5 describes the decimation of the derived progressive fields into P lines and LS (line subtraction) signals.

As described in FIG. 5, the derived 525 progressive lines for fields one and two are next decimated into lines denoted as P and combined with LS signals derived from the source lines. Note that these signals, form an interlaced scanning structure from field to field. Thus, the P lines that are selected directly from the derived progressive fields, form a 525 interlaced picture. The lines LS parallel the 'LD' signal in the HDMAC-60 system. The LS signal is a form of the line differential signal called a line subtraction signal, and represents the difference between two 1050 interlaced source lines in a particular field. The equations for the vertical filter operation previously described and the line subtraction signal derivation are shown in FIG. 6. Note that the LS signal requires all source interlaced lines to generate the filter functions, but that the signal is vertically decimated and only every other line is represented in this form. Also, the nature of the subtraction changes line orientation from field to field, although the filter coefficients remain as 1:−1. Thus, the derived progressive lines and the LS signal form an alternating, interlaced structure from field to field as shown in FIG. 5

Reconstruction of the 1050, 2:1 source signal is described in FIG. 7. The goal is to transmit lines as P and LS in terms of the original source interlaced lines S, and then at the receiver do the following: display P lines as the interlaced 525 2:1 NTSC compatible image and reconstruct as faithfully as possible all of the source 'S' 1050 2:1 interlaced lines.

As shown in FIG. 7, for field 1, the following lines are transmitted:

$$P1_1 = (\tfrac{1}{4})S1_1 + (\tfrac{3}{4})S1_3$$

$$LS1_2 = S1_1 - S1_3.$$

It can be shown that $S1_1$ and $S1_3$, the original source interlaced lines 1 and 3 for field 1, can be derived from the equations in FIG. 7:

$$S1_1 = (\tfrac{3}{4})LS1_2 + P1_1$$

$$S1_3 = -(\tfrac{1}{4})LS1_2 + P1_1.$$

As is the case with HDMAC-60, the bandwidths of all components including luminance components in HDMAC-1050 are nominally determined to be 9.5 MHz for transmission in an FM channel. The base bandwidths of the actual video components before HDMAC-1050 processing are based on a four line sequence, as in HDMAC-60. For a typical transmission of four luminance lines in a given field:

$Y_3 = P_3$ up to 16.8 MHz;

$Y_2 = LS_2$ up to 4.75 MHz;

$Y_1 = P_1$ up to 9.5 MHz;

$Y_4 = LS_4$ up to 4.75 MHz.

The bandwidths listed above are nominal, and as with HDMAC-60 may be changed to fit the FM channel with no difference in signal processing other than the baseband processing horizontal filters. The signals are formatted from their respective base bandwidths using time expansion and compression circuits at the encoder, as is the case with HDMAC-60. Thus, $Y_3$ is a wideband luminance signal that is time expanded 9:16, which will make the 16.8 MHz signal nominally 9.5 MHz for transmission. The LS signal is time compressed 2:1 in order to utilize the 9.5 MHz channel most efficiently considering the base bandwidth of the LS signal is 4.75 MHz. Finally, the luminance line $Y_1$ is limited to 9.5 MHz and no expansion or compression is required. Because of this bandwidth width processing, a stairstep or 'diamond-like' spectrum is generated for the two dimensional video spectrum that is well matched to the characteristics of the human visual system. In addition, the reconstruction algorithms described previously and shown in FIG. 7 do not apply in general for all horizontal frequencies. Rather, as shown in FIG. 7, horizontal frequencies up to 4.75 MHz are delivered by any transmitted component, but contributions above 4.75 MHz are made only from lines $Y_1$ and $Y_3$. The next horizontal frequency breakpoint is 9.5 MHz, above which only component $Y_3$ makes a contribution. Therefore, there are two breakpoints denoted in the reconstructed lines in FIG. 7: 4.75 MHz due to the LS limit and 9.5 MHz due to the $Y_1$ limit. Processing above 9.5MHz will now be described in terms of a possible vertical filtering and decimation process the $Y_3$ lines which are the only contributors above 9.5 MHz baseband once every four source lines.

High Frequency Luminance Vertical Filtering and Decimation

As is the case with the HDMAC-60 format, one out of every four source luminance lines are processed as wideband luminance signals in HDMAC-1050. These lines, referred to as $Y_3$ lines, have a source bandwidth of nominally 16.8 MHz corresponding to 495 TVL/PH. In order to be transmitted in a 9.5 MHz channel, these lines must be time expanded by a factor of 9:16. It should be noted that all components in HDMAC-1050 are transmitted with the same expansion ratios as HDMAC-60, and hence the time and frequency budgets are the same for both systems.

Figure 8:
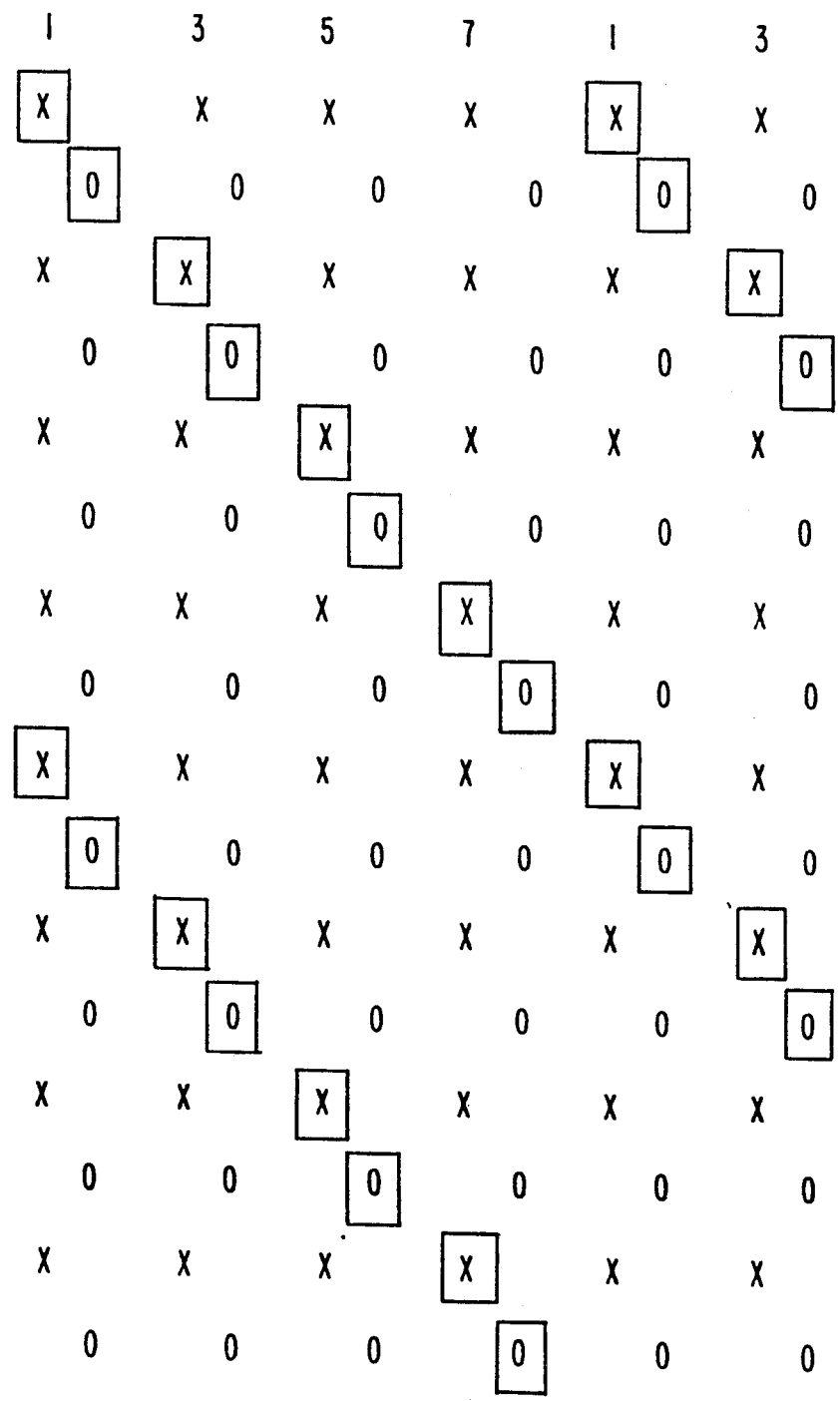
FIG. 8 describes a decimation sequence for the wideband luminance signal.

Because of the interlace source scanning structure and the one-of-four processing package, a possible decimation sequence for the wideband luminance lines $Y_3$ is shown in FIG. 8. In the figure, the X lines represent odd interlaced source fields of luminance and the 0 lines the even fields of source luminance. Note from the figure that it takes the decimation sequence 8 source fields to come back in phase, and because the field rate is 59.94Hz, the nominal field update rate for $Y_3$ high frequency (wideband) lines is 7.5 Hz. This rate is objectionable to the human visual system, and such aliasing will appear as excessive field flickering of high frequency information along the diagonal axis. It is therefore required to suppress the diagonal energy in the HDMAC-1050 source image to the point that high horizontal frequencies are vertically filtered and hence the potential temporal alias is suppressed. The effect is to reduce the diagonal resolution of the source image, but this is tailored to the natural characteristics of the human visual system, which is most sensitive to frequencies directly oriented on the horizontal and vertical axes. Other decimation sequences can also be used which will allow for higher field update rates, for example 15 Hz.

Motion adaptive circuits may be used at the decoder, perhaps in conjunction with motion vectors transmitted from the encoder, in order to build up each 7.5 Hz field at the interlaced field rate of 59.94 Hz when there is no motion. This will allow for more vertical resolution when there is no motion, because the memory stores each decimated field of high frequency information derived from the one-of-four luminance lines that is wideband and reconstructs all 525 wideband lines of any given field at a 59.94 Hz update rate when there is no motion in the picture. However, in order to reduce the potential for strong aliasing, some diagonal filtering is required.

Chrominance Processing

The chrominance signals in the HDMAC-1050 format are similar in bandwidth and compression/expansion to those of the HDMAC-60 format (described in the '557 application). However, the original source 1050 lines interlaced chrominance signals must be converted to 525 progressive (as was accomplished for the luminance signals) in a way that creates spatially correct progressive lines but that also allows for reconstruction of the original 1050 interlaced structure. Again, as is the case for the luminance signal, the chrominance data capacity is the same in HDMAC-1050 as in HDMAC-60. Out of every four source lines, there are transmitted color difference signals V and U (or I and Q). In both the HDMAC-1050 and HDMAC-60 systems, the chrominance vertical resolution is equivalent to alternate-line chrominance in a 525 interlaced system.

Figure 9:
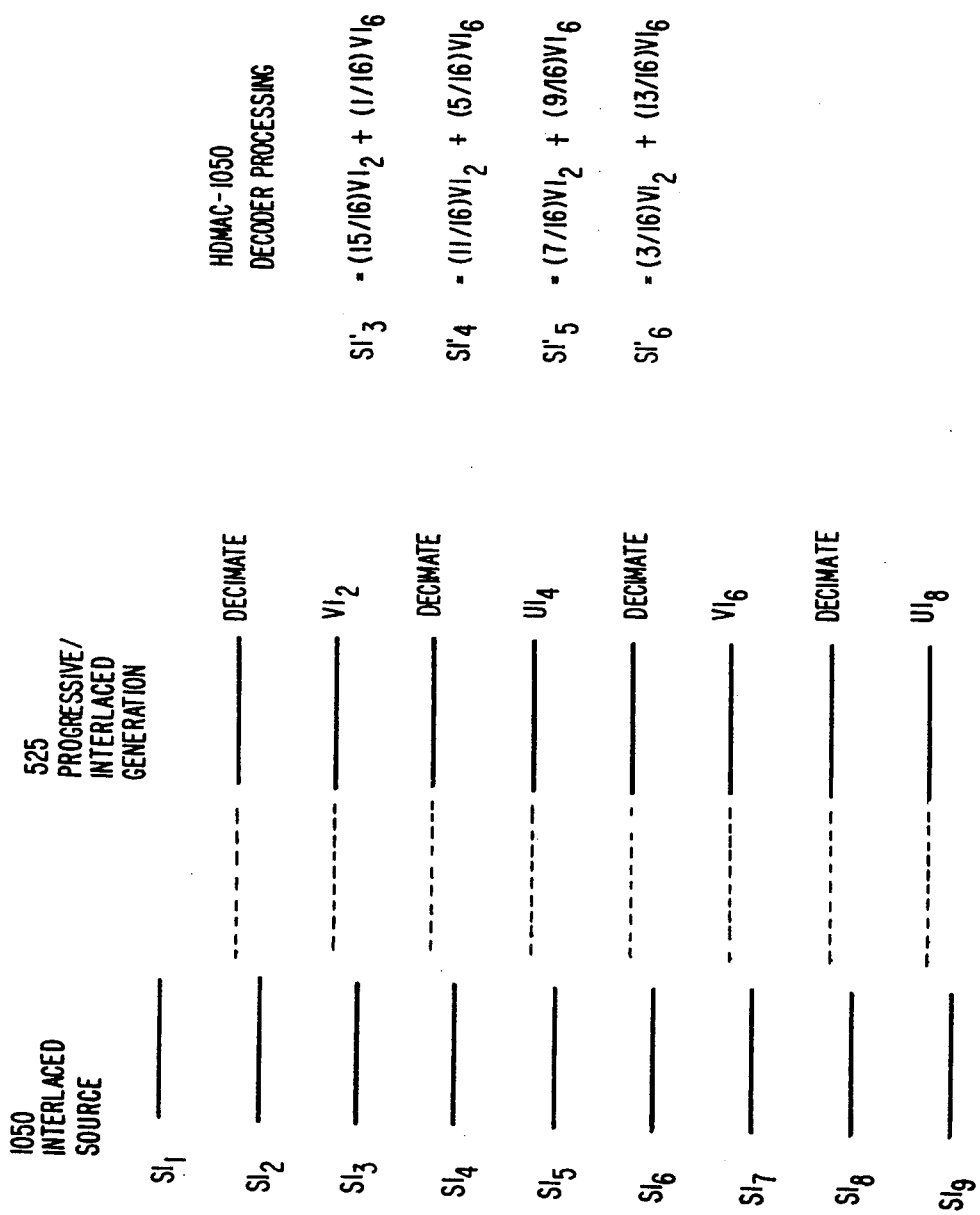
FIG. 9 describes the derivation of the chrominance signals.

The derivation of the chrominance signals is shown in FIG. 9. First the 1050 2:1 source is converted to a 525 1:1 image, which implies no change in the data capacity. This conversion is accomplished using the same vertical filter as is used for luminance—$(\frac{1}{4}):(\frac{3}{4})$ for odd fields and $(\frac{3}{4}):(\frac{1}{4})$ for even fields. This allows for compatibility with 525 1:1 and 525 2:1. As shown in FIG. 9 for field 1, out of every four source lines, there are two color-difference signals that are actually transmitted for HDMAC-1050: $Vl_i$ and $Ul_{i+2}$. Therefore, just as with the luminance component, the chrominance signals are readily transcoded to 525 1:1 or 525 2:1, where ultimately the chrominance resolution is comparable to alternate-line 525 2:1 chrominance vertical resolution. In order to reconstruct spatially accurate lines of V and U at the HDMAC-1050 decoder, the vertical processing shown in FIG. 9 should be applied to the transmitted signals. The example in the figure is for field one lines of V. Note the interpolating filter requires two adjacent transmitted lines of a particular component, with successive weights of 15:1, 11:5, 7:9 and 3:13. This process repeats every four source lines.

HDMAC-1050 System Considerations

Figure 10:
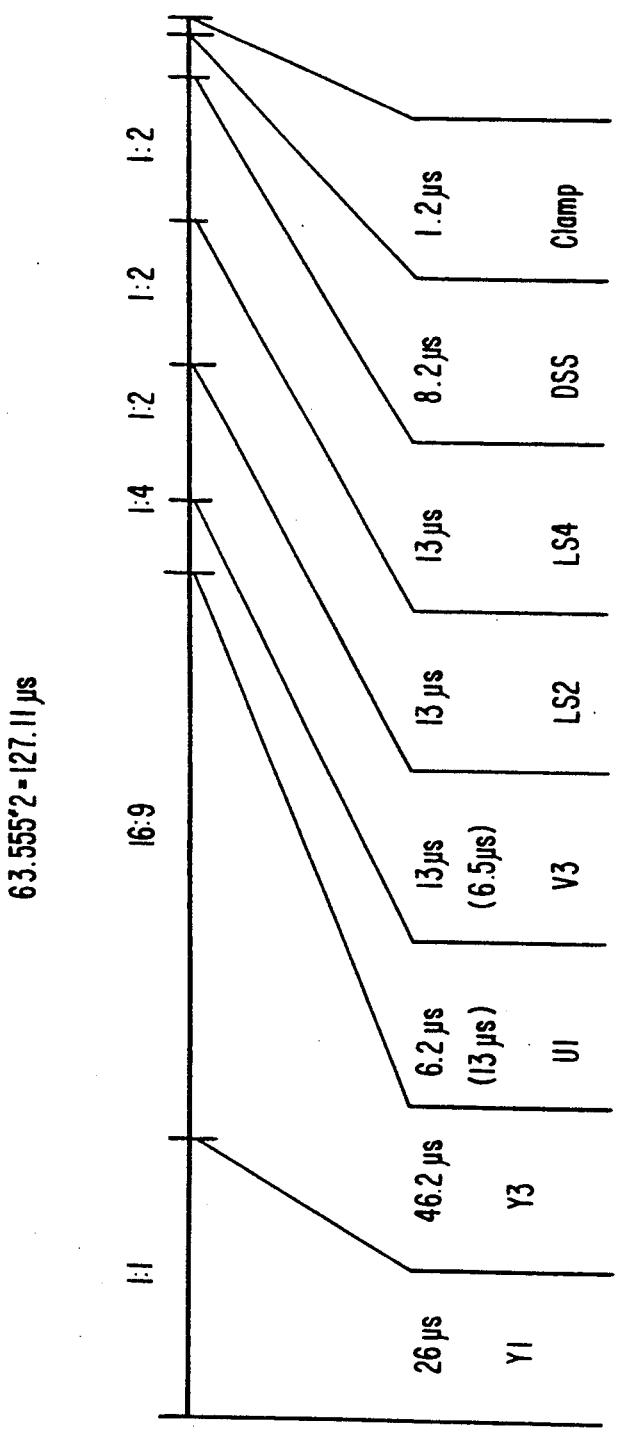
FIG. 10 describes the components and timing budget of the HDMAC-1050 signal.

The fundamental format of transmission for the HDMAC-1050 system is comparable to transmission of signals in the HDMAC-60 system. Referring to FIG. 10, the signal components and the corresponding 'super-line' timing budget are depicted. In addition to the video components $Y_3$ (wideband luminance); $Y_1$ (narrowband luminance); $LS_2$ and $LS_4$ (line subtraction signals from luminance); $U_1$ (color difference for source line 1); and $V_3$ (color difference for line 3); there is also provided a clamp interval and a period for digital synchronization and compact disk quality stereo sound (DSS). Many features of HDMAC-60 such as companding and (adaptive) preemphasis may also be applied to HDMAC-1050. These features are described in the '557 application incorporated by reference herein. Note also that the chrominance signal bandwidths for each color difference signal may alternate on a particular field to field sequence as with HDMAC-60, but this feature is not a mandatory requirement. It is a feature that better matches the two-dimensional chrominance spectrum to the 'diamond' response of the human visual system.

Figure 11:
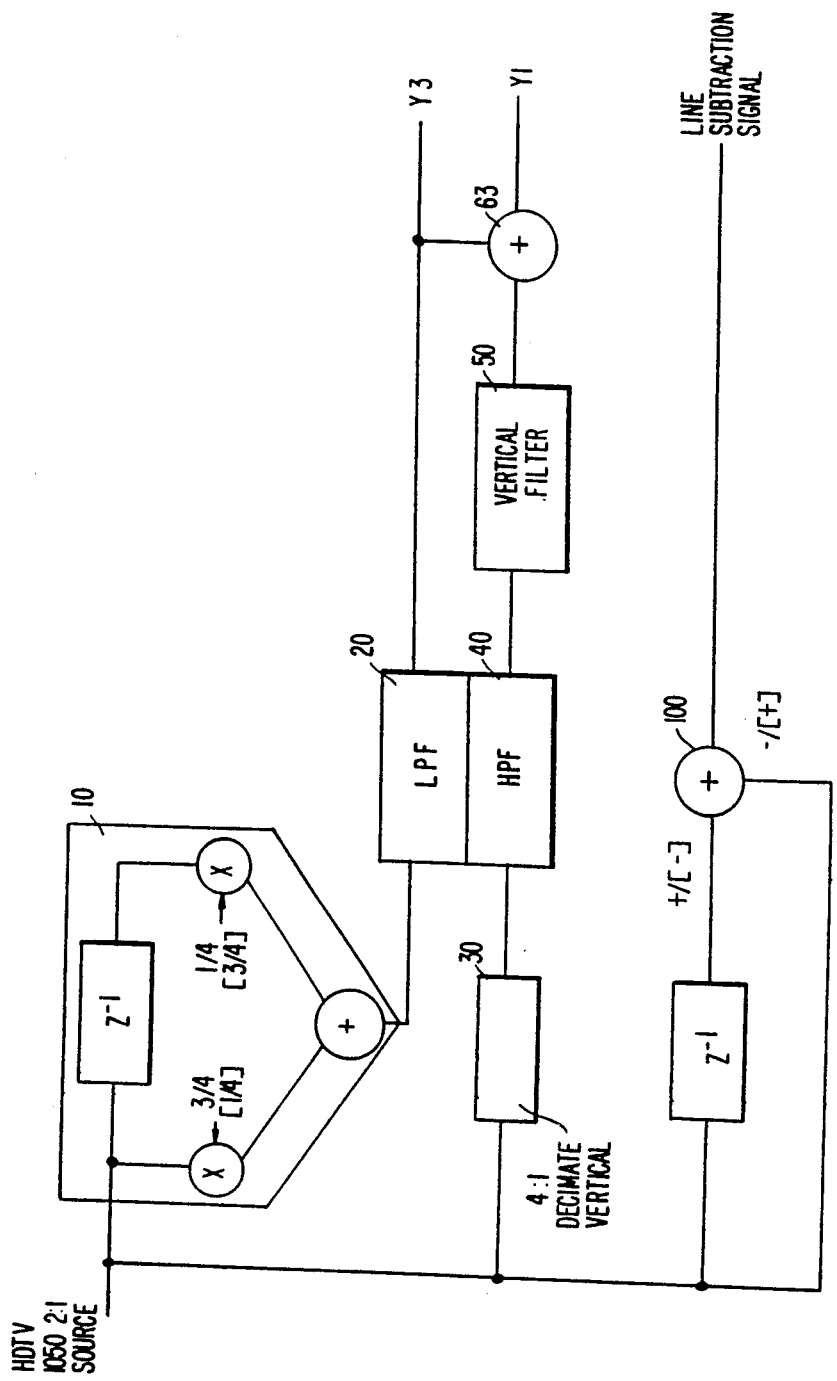
FIG. 11 is a block diagram of filtering hardware which can be used to encode the source signal into the HDMAC-1050format.

For luminance processing at the encoder, refer to the hardware considerations shown in FIG. 11. The original 1050 2:1 source lines are vertically filtered in block 10 by a vertical FIR filter, a known device, with coefficients (¾):(¼) that alternate from field to field as previously described. The output of this vertical filter is the 525 1:1 signal. When horizontally lowpass filtered to nominally 9.5 MHz by block 20, a known device, narrowband luminance line $Y_1$ is formed. The original source wideband lines are vertically decimated by block 30, a known device, and one of four lines are presented to the horizontal highpass filter block 40, also a known device. This filter passes horizontal frequencies above 9.5 MHz and passes them to the vertical filter block 50, also a known FIR vertical filter device, which limits the vertical energy to help suppress aliasing after 1050 2:1 reconstruction at the decoder, as previously suggested. Wideband line $Y_3$ is achieved by adding the $Y_1$ narrowband component to the output of the vertical filter, using adder block 60, a known device.

The line subtraction signal previously described is generated by FIR filter block 100 in FIG. 11, a known device. The coefficients for the filter alternate from field to field from 1:−1 to −1:1, as previously described.

All encoder processing can now be performed on the HDMAC-1050 components derived above using the HDMAC-60 formatting hardware, with $Y_1$, $Y_3$, $LS_2$, and $LS_4$ substituted for components $Y_1$, $Y_3$, $LD_2$, and $LD_4$ in HDMAC-60. Similarly, the chrominance signals derived in FIG. 9 must be applied, which requires another vertical filter block 10 of FIG. 11, and a decimator. Equalizing delays must also be provided that are tailored to the processing in the HDMAC-1050 video paths.

At the HDMAC-1050 decoder, the fundamental HDMAC-60 formatting hardware will suffice, but the video reconstruction must be performed for luminance according to the equations in FIG. 7 for luminance and FIG. 9 for chrominance. Vertical interpolation of the high frequency luminance signal may be treated in the same manner for HDMAC-1050 and HDMAC-60 because a 1:4 interpolation is required in both systems.

Figure 12:
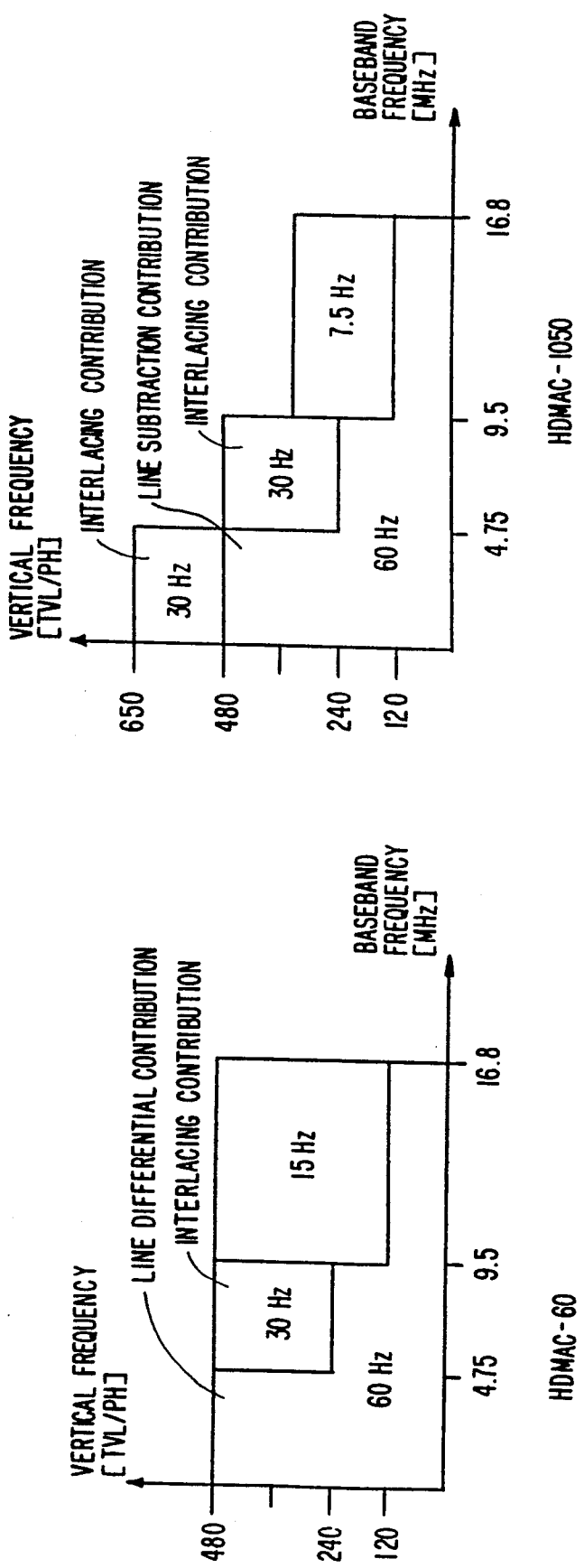
FIG. 12 compares the two-dimensional luminance spectras of HDMAC-60 and HDMAC-1050.

Finally, a comparison of the two-dimensional luminance spectras expected from both HDMAC formats is shown in FIG. 12. Note that the region above 480 TVL in HDMAC-1050 is shown at 30 Hz, due to the nature of interlace. There is a tradeoff in that HDMAC-60 allows for the potential for more diagonal energy with less threat of heavy aliasing, whereas the HDMAC-1050 signal requires more filtering of this region to prevent severe aliasing due to the slow temporal update rate.

FIG. 12 indicates a field update rate of 7.5 Hz for HDMAC-1050, as described in the vertical decimation sequence embodiment illustrated by FIG. 8. It is to be noted however that the instant invention is not limited to the use of this particular decimation sequence and other vertical filtering techniques in conjunction with other decimation sequences can be used which will allow for higher field update rates, for example 15 Hz.

We claim:

1. A method of encoding an interlaced television signal having a predetermined number of frames per second, each frame consisting of a plurality of fields each having a plurality of lines, each line comprising a luminance component having a predetermined luminance bandwidth and at least one chrominance component, for transmission or recording with a channel bandwidth more narrow than said luminance bandwidth, comprising the steps of:

processing said plurality of lines in groups, each group containing information from a multiplicity of said lines, to generate a plurality of signal packets, said signal packets comprising a first luminance component, having a first time compression ratio, a second luminance component having a second time compression ratio, said second time compression ratio being different from said first time compression ratio, said first and second luminance components being formed from at least two lines at mixing ratios which change at field rate, at least one chrominance component separate from said luminance components, and first and second line subtraction components; and combining said signal packets to generate a time multiplexed line signal having said signal packets in time slots thereof.

2. A method according to claim 1, further comprising the steps of:

receiving or regenerating said time multiplexed line signal;

demultiplexing said time multiplexed line signal to generate individual signal packets;

regenerating said first luminance component, second luminance component and at least one chrominance component from said signal packets; and regenerating said interlaced television signal therefrom.

3. A method of claim 1 further comprising the steps of processing an audio signal into a further signal packet and time multiplexing said signal packets with said further signal packet.

4. A method of encoding into groups of line components, an interlaced television image having a predetermined number of frames per second, each frame having a plurality of fields comprising a plurality of lines each having a first line period, each line comprising a luminance component having a predetermined luminance bandwidth and at least one chrominance component, for transmission or recording as a time multiplexed signal on a channel having a bandwidth which is more narrow than said luminance bandwidth, said method comprising the steps of:
vertically filtering the lines of a first field to form a first sequence of line components,
vertically filtering the lines of a second field to form a second sequence of line components;
deriving from lines of said first field a first sequence of line subtraction components;
deriving from lines of said second field a second sequence of line subtraction components;
decimating said first sequence of line components and said first sequence of line subtraction components to form a first group of line components; and
decimating said second sequence of line components and said second sequence of line subtraction components to form a second group of line components.

5. The method of claim 4 further comprising the steps of:
processing said groups to generate a plurality of signal packets, said signal packets comprising a first luminance component having a first time compression ratio, a second luminance component having a second time compression ratio, a plurality of said line subtraction components and at least one chrominance component separate from said luminance components; and
generating said time multiplexed line signal having a second line period greater than said first line period.

6. An apparatus for encoding into groups of line components, an interlaced television image having a predetermined number of frames per second, each frame having a plurality of fields each comprising a plurality of lines each having a first line period, each line comprising a luminance component having a predetermined luminance bandwidth and at least one chrominance component, for transmission or recording as a time multiplexed signal on a channel having a bandwidth which is more narrow than said luminance bandwidth, said apparatus comprising:
means for vertically filtering first selected lines of a first field so as to form a first sequence of line components, and for vertically filtering first selected lines of a second field so as to form a second sequence of line components, said line components falling in the same vertically interpolated position from field to field; and
means coupled to said filter means, for deriving from second selected lines of said first field, a third sequence consisting of line subtraction components, and for deriving from second selected lines of said second field, a fourth sequence consisting of line subtraction components.

7. Apparatus according to claim 6, further comprising signal, thereby creating a received time multiplexed signal;
means for demultiplexing said received time multiplexed signal to generate said signal packets;
means coupled to said demultiplexing means for processing said signal packets to generate said first luminance component, said second luminance component, said line subtraction components and said at least one chrominance component; and
means coupled to said processing means for reconstituting said interlaced television signal from at least said first luminance component, said second luminance component, said line subtraction components and said at least one chrominance component.

* * * * *

UNITED STATES PATENT AND TRADEMARK OFFICE
CERTIFICATE OF CORRECTION

PATENT NO. : 4,992,853

DATED : February 12, 1991

INVENTOR(S) : ALAN P. CAVALLERANO

It is certified that error appears in the above-identified patent and that said Letters Patent is hereby corrected as shown below:

Column 10:

Claim 7, line 19, after "further comprising" insert --receiving means for receiving said time multiplexed--.

Signed and Sealed this

Seventh Day of July, 1992

Attest:

DOUGLAS B. COMER

Attesting Officer     Acting Commissioner of Patents and Trademarks